(12) United States Patent
Wu

(10) Patent No.: US 6,323,487 B1
(45) Date of Patent: Nov. 27, 2001

(54) IR OPTICAL POSITION SENSOR SYSTEM

(75) Inventor: Cunkai Wu, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/237,309

(22) Filed: Jan. 26, 1999

(51) Int. Cl.[7] .................................................. G01J 5/02
(52) U.S. Cl. ........................................ 250/341.1; 359/356
(58) Field of Search .......................... 250/341.1; 359/356

(56) References Cited

U.S. PATENT DOCUMENTS

| | | | |
|---|---|---|---|
| 5,288,649 | * | 2/1994 | Keenan ................................. 438/54 |
| 5,528,698 | * | 6/1996 | Kamei et al. ........................ 382/100 |
| 5,585,625 | * | 12/1996 | Spies .................................... 250/221 |
| 5,653,462 | * | 8/1997 | Breed et al. ......................... 280/735 |
| 5,737,120 | * | 4/1998 | Arriola ................................. 359/356 |
| 5,785,347 | * | 7/1998 | Adolph et al. ....................... 280/735 |
| 6,113,137 | * | 9/2000 | Mizutani et al. .................... 280/735 |

* cited by examiner

*Primary Examiner*—Constantine Hannaher
*Assistant Examiner*—Shun Lee
(74) *Attorney, Agent, or Firm*—Jimmy L. Funke

(57) ABSTRACT

In a preferred embodiment, an infrared optical position detection system, including: an infrared emitter to emit infrared radiation toward an object; a receiver to receive the infrared radiation scattered by the object and to determine position of the object; the receiver including a detector; and the receiver including an optical system having two and no more than two lenses.

6 Claims, 3 Drawing Sheets

IR OPTICAL POSITION SENSOR SYSTEM

BACKGROUND OF THE INVENTION

1. Field of the Invention

The present invention relates to optical position sensor systems generally and, more particularly, but not by way of limitation, to a novel infrared optical position sensor system which may be employed to determine the position of an occupant of a vehicle and to disable an air bag restraint if it is determined that the occupant may be injured by deployment of the air bag restraint.

2. Background Art

While the present invention is described, for illustrative purposes, as being applied to occupant classification and position detection in a vehicle, it will be understood that it can be employed in any optical receiver system in which optical image quality is not important.

Inflatable restraints, or air bags, are increasingly being used in vehicles to protect an occupant of a vehicle in case an accident occurs. Typically, a control system senses the occurrence of an accident and causes the air bag to deploy to protect the occupant from colliding with the windshield or dashboard, for example, of the vehicle. An occupant proximity sensor system may comprise part of the control system. Such a system monitors the position of the occupant of the front-outboard passenger seat and automatically, without any action required of the driver or the passenger, determines whether to suppress deployment or allow deployment of the front air bag (and perhaps the side air bag also, if the vehicle is so equipped) applicable to this position. The determination whether or not to suppress air bag deployment is made based on the occupant being in the "at-risk" zone or on classifying the occupant as being in a rear-facing infant seat (RFIS). Conversely, the system allows air bag deployment for a properly seated occupant, i.e., seated with hips back, rearward on the seat cushion and with back resting on the seat back, outside of the at-risk zone.

Upon determining the position/classification of the occupant of the front-outboard seat, the system sends a signal to the sensing and diagnostic module indicating whether to suppress or allow air bag deployment. The system also sends a signal to a display indicating whether the air bag is in a suppressed or an enabled state. If the air bag is in a suppressed state, the signal alerts the driver or passenger to take corrective action, if desirable.

There are many kinds of sensor systems under development. So far, there are mainly two kinds of occupant position sensors: infrared- and ultrasonic-based sensors. Compared to the ultrasonic sensor, the infrared sensor has the fastest response time. An infrared occupant position sensor can classify and recognize an occupant in less than 10 milliseconds.

The typical infrared occupant position sensor has two main elements: an emitter and a receiver. The emitter is a light source that radiates infrared light and illuminates target objects. The receiver consists of an optical system and a detector. The optical system collects light from the target objects and focuses the light signal on the detector. In most such applications, the scattering signal is very weak.

The common requirement for the receiver/optical system is to receive more light and ensure that the spot size on the detector is sufficiently small to allow the optical system to produce the required image quality. Unfortunately, in most cases the scattering light is very weak. In addition, the size of the detector is limited and a highly efficient use of detectors is required. An effective receiver optical system should have a large aperture, short focal length, and large field of view. Unfortunately, a major disadvantage of known such optical systems is complexity and a concomitant prohibitively high cost.

Accordingly, it is a principal object of the present invention to provide an infrared vehicle occupant position detection system for classifying and determining the position of a vehicle occupant that is highly accurate and reliable.

It is a further object of the present invention to provide such a vehicle occupant position detection system that is economical to construct.

It is an additional object of the present invention to provide such a vehicle occupant position detection system that has a large aperture, a short focal length, and a large field of view.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an infrared optical position detection system, comprising: an infrared emitter to emit infrared radiation toward an object; a receiver to receive said infrared radiation scattered by said object and to determine position of said object; said receiver including a detector; and said receiver including an optical system comprising two and no more than two lenses.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
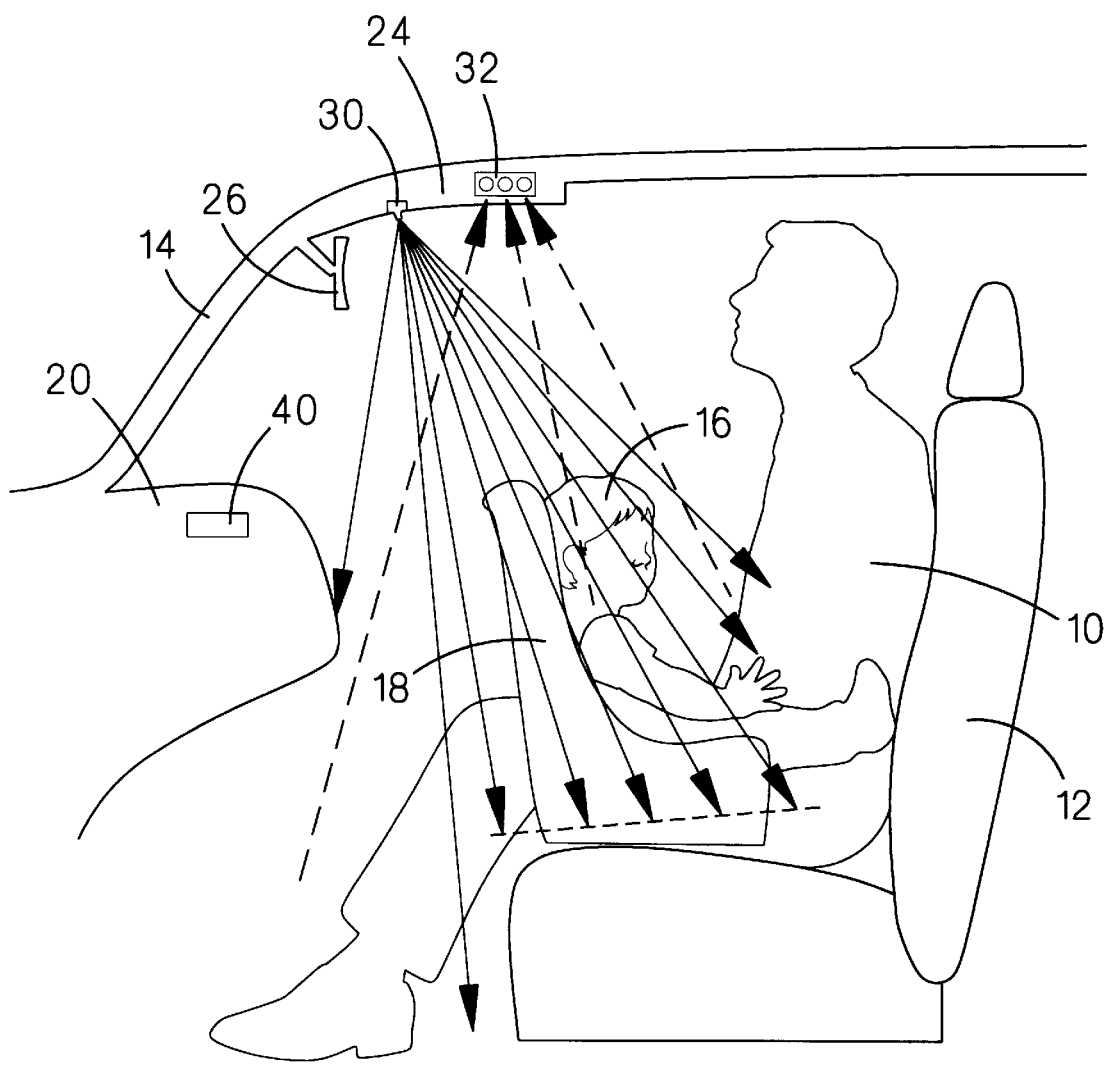
FIG. 1 is a cut-away, side elevational view of a vehicle, with an occupant seated therein, and with the position of the occupant being determined by the system of the present invention.

Reference should now be made to the drawing figures on which similar or identical elements are given consistent identifying numerals throughout the various figures thereof, and on which parenthetical references to figure numbers direct the reader to the view(s) on which the element(s) being described is (are) is best seen, although the element(s) may be seen on other figures also.

FIG. 1 illustrates a person 10 seated on the front-outboard seat 12 of a vehicle 14. As shown, person 10 is properly seated on the seat 12, with his hips and back placed against the back of the seat, and with the seat set at a safe distance spaced from dashboard 20 of vehicle 14. Also illustrated on FIG. 1 is an alternative arrangement in which an infant 16 is seated in a rear facing infant seat 18, clearly within the at-risk zone.

Mounted in a console 24 behind a rear view mirror 26 in vehicle 14 is an emitter module 30, which emits infrared radiation, and a receiver module 32, which receives infrared radiation scattered from objects in the front of the passenger compartment of the vehicle. The receiver also includes a position sensitive detector that detects the energy center of the light spot on the detector.

The recommended light spot size on the detector is larger than 200 micrometers and the present system produces a larger spot size. The image quality of the receiver is not important. The system recognizes occupant type, as well as occupant position and posture, with dynamic occupant position being determined using triangulation.

Modules 30 and 32 are connected to a control system (not shown) which classifies person 10 and determines if the person is out of the at-risk zone and is not seated in a rear facing infant seat. In this case, person 10 is safely seated and, accordingly, the control system will enable the air bag (not shown on FIG. 1) associated with the front-outboard seat, so that the air bag can be deployed in case an accident occurs. The control system will also provide an indication on a display 40 that the air bag is enabled. As noted above, if display 40 should indicate that the air bag is suppressed, then person 10 or the driver of vehicle 14 would have the opportunity to take corrective measures.

Figure 2:
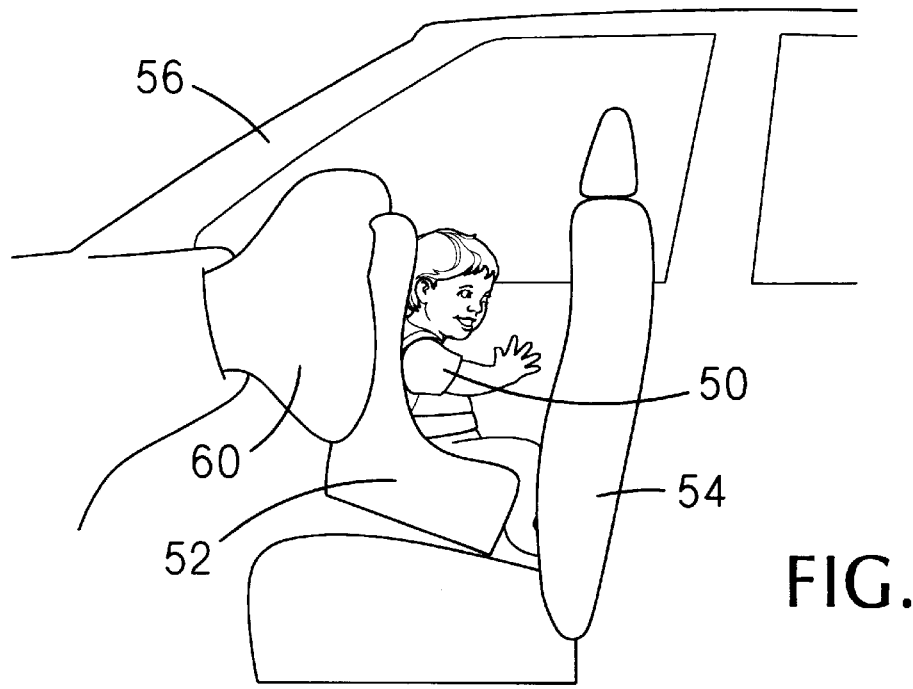
FIG. 2 is a cut-away, side elevational view of a vehicle, with a child seated in a rear facing infant seat, and indicating the consequences of having an air bag deployed in this situation.

FIG. 2 illustrates the consequences of failure to disable an air bag when the air bag is used with a child seated in a rear facing infant seat. Here, a child 50 is seated in a rear facing infant seat 52 that is attached to the front-outboard seat 54 of a vehicle 56. In this case, deployment of air bag 60 has not been suppressed and the air bag has deployed against rear facing infant seat 52, forcing the rear facing infant seat rearward. It will be appreciated that such an action can cause serious injury or death to child 50 and, in fact, there have been reported instances of such injury or death.

Figure 3:
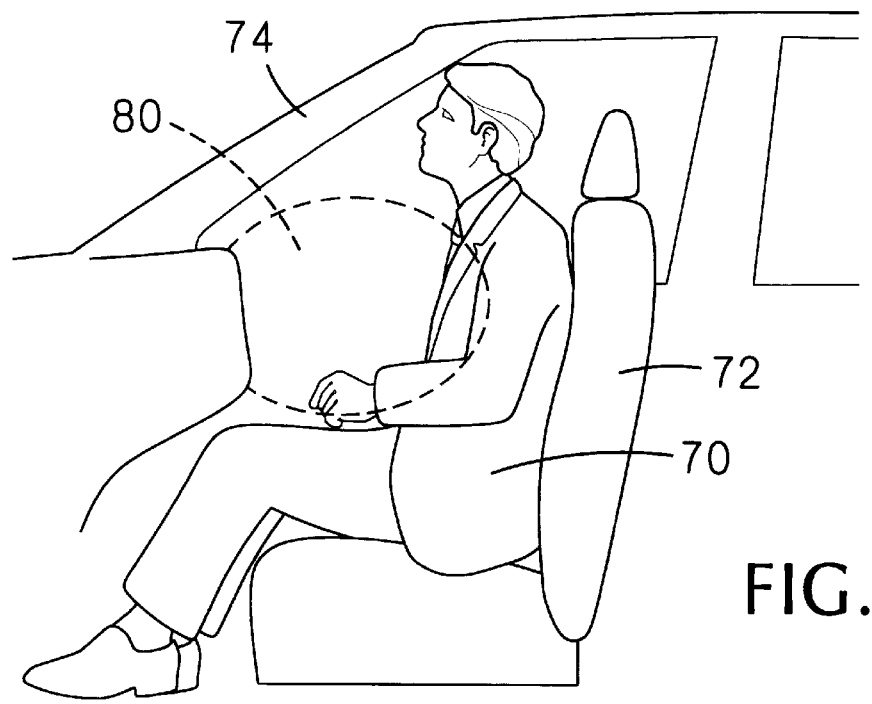
FIG. 3 is a cut-away, side elevational view of a vehicle, with an occupant seated such that the occupant is partially within the at-risk zone.

FIG. 3 illustrates the potential consequences of a person disposed within the at-risk zone. Here, a person 70 is seated on a front-outboard seat 72 in a vehicle 74. Person 70 is properly seated on seat 72, with his hips and back against the back of the seat; however, in this case, the seat has been moved too far forward, thus placing part of the body of the person within at risk-zone 80. Thus, in this case, deployment of an air bag, such as air bag 60 (FIG. 2) has the potential of causing serious injury or death to the person and again, in fact. there have been reported instances of such injury or death. Operation of a proper position sensing system (FIG. 1) will suppress deployment of the air bag and will alert person 70 and the driver of vehicle 74 to the potential hazard. In this case, person could simply move seat 72 rearwardly to place himself outside of at risk zone 80, the position sensing system will enable the air bag, and display 40 (FIG. 1) would indicate enablement of the air bag.

Figure 4:
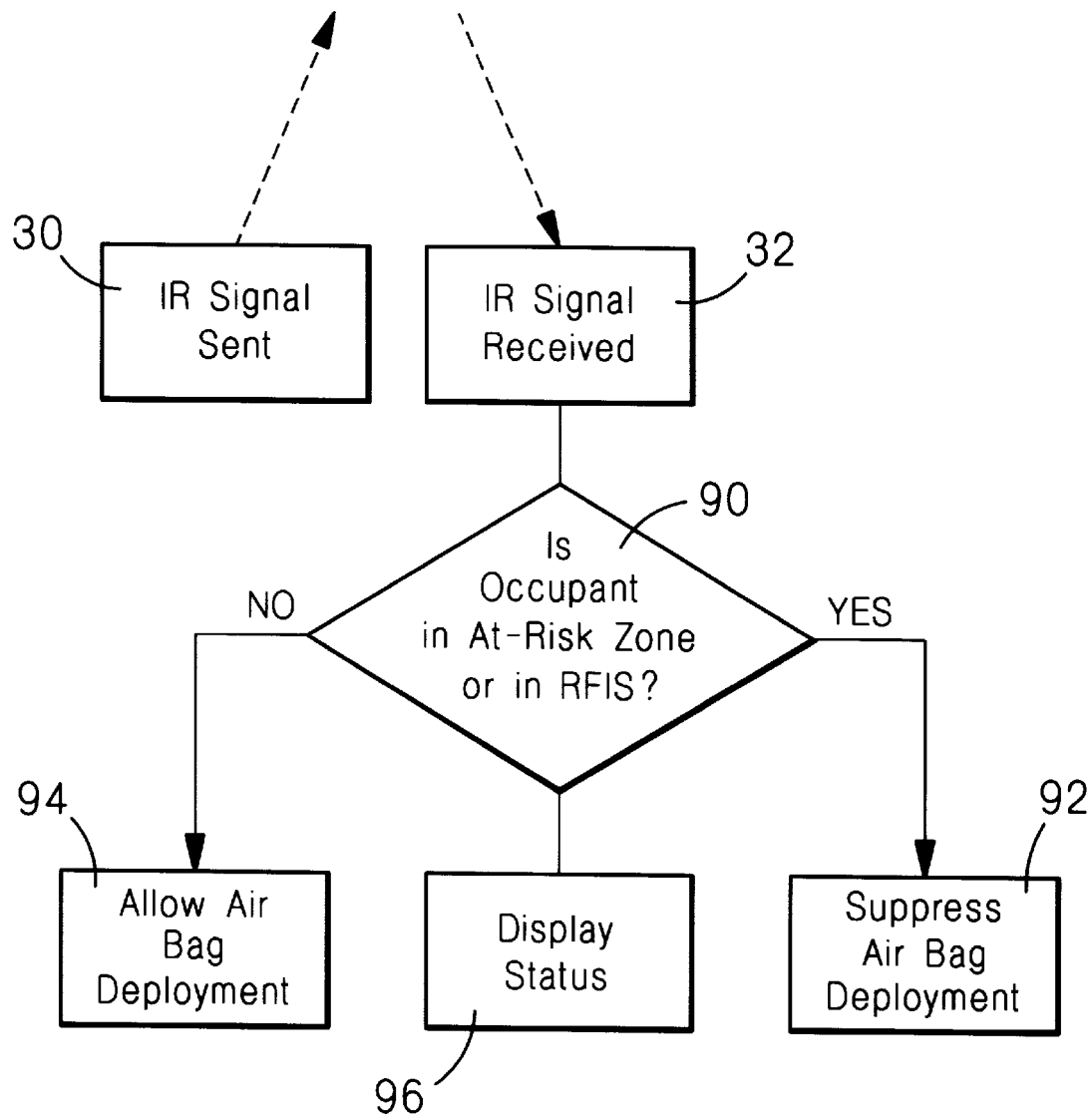
FIG. 4 is a block logic flow diagram for the system of the present invention.

FIG. 4 illustrates the control logic for the position sensing and control system of the present invention. Here, emitter element 30 (FIG. 1) transmits infrared radiation and the reflection thereof is received by receiver element 32 (FIG. 1). A sensing and diagnostic module 90 analyzes the scattered radiation and determines the status and position of an occupant of a front-outboard seat. If the occupant is in the at-risk zone (FIG. 3) or if the occupant is seated in a rear facing infant seat (FIG. 2), sensing and diagnostic module 90 will cause suppression of air bag deployment, at 92. If the occupant is outside of the at-risk zone and is not seated in a rear facing infant seat, sensing and diagnostic module 90 allows enablement of the air bag at, 94. In either case, the status of the air bag is displayed, at 96. As noted above, the procedure described with reference to FIG. 4 takes less than 10 milliseconds. This procedure is continuously reiterated while the vehicle is in operation, so that changes in position can be immediately detected and the air bag disabled when appropriate.

Figure 5:
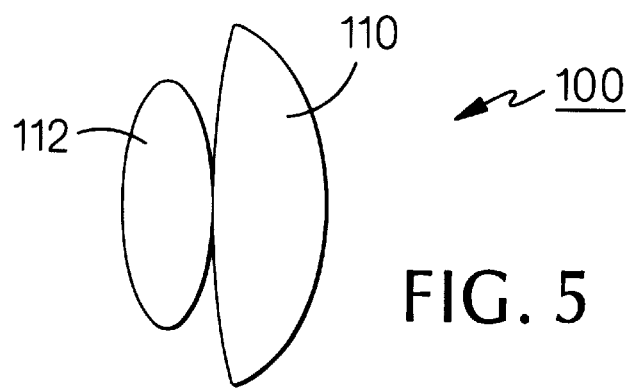
FIG. 5 is a side elevational view of the two lenses employed in the system of the present invention.

FIG. 5 illustrates the lens portion of an optical system, constructed according to the present invention, and generally indicated by the reference no numeral 100. Lens portion 100 consists of two lenses: an aspheric lens 110 used in combination with a symmetric-convex spherical lens 112. The convex aspheric surface of aspheric lens 110 receives scattered infrared radiation (FIG. 1), while the spherical surface of aspheric lens 110 contacts spherical lens 112, and the spherical lens faces the detector (not shown).

Most preferred parameters for aspheric lens 110 are: focal length, $f_a$=12 mm, diameter of the lens, $D_a$=18 mm, and back focal length, $f_{ab}$=6.9 mm. Most preferred parameters for spherical lens 112 are: focal length, $f_s$=12 mm, diameter of the lens, $D_s$=15 mm, and back focal length, $f_{sb}$=18.3 mm. Most preferred parameters for the receiver optical system are: effective focal length, f=8.7 mm, aperture diameter of the system, D=15.7 mm, and back focal length $f_b$=3.77 mm. The field of view of the optical system is 50 degrees. While the foregoing parameters can be changed, depending on the requirements of focal length and aperture, these parameters provide the simplest and most economical system. The system can be employed in any receiver optical system in which the image quality of the system is not important.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. An infrared optical position detection system, comprising:
    (a) an infrared emitter to emit infrared radiation toward an object;
    (b) a receiver to receive said infrared radiation scattered by said object and to determine position of said object;
    (c) said receiver including a detector;

(d) said receiver including an optical system comprising two and no more than two lenses; and wherein:

(e) said two and no more than two lenses comprise an aspheric lens having its convex aspheric surface directed toward said object and its spherical surface adjacent a symmetric-convex lens.

2. An infrared optical position detection system, as defined in claim 1, wherein:

said aspheric lens has a focal length of 12 mm, a lens diameter of 18 mm, and a back focal length of 6.9 mm; said symmetric-convex spherical lens has focal length of 12 mm, a lens diameter of 15 mm, and a back focal length of 18.3 mm; and said optical system has an effective focal length of 8.7 mm, a system aperture diameter of 15.7 mm, and a back focal length of 3.77 mm.

3. An infrared optical position detection system, as defined in claim 2, wherein:

said optical system has a field of view of 50 degrees.

4. An infrared optical position detection and classification system in combination with a vehicle air bag deployment system, comprising:

(a) an infrared emitter to emit infrared radiation toward a passenger;

(b) a receiver to receive said infrared radiation scattered by said passenger and to determine position and classification of said passenger, (c) said receiver including a detector including an optical system comprising two and no more than two lenses;

(d) control means connected to said receiver to suppress enablement of a vehicle air bag if it is determined that an occupant is in an at-risk zone or is seated in a rear facing infant seat and to enable deployment of said vehicle air bag if it is determined that said occupant is not in said at-risk zone or is not seated in said rear facing infant seat and wherein:

(e) said two and no more than two lenses comprise an aspheric lens having its convex surface directed toward said object and its spherical surface adjacent a symmetric-convex lens.

5. An infrared optical position detection and classification system in combination with a vehicle air bag deployment system as defined in claim 4, wherein: said aspheric lens has aspheric lens has a local length of 12 mm, a lens diameter of 18 mm, and a back focal length of 6.9 mm; and said symmetric-convex spherical lens has focal length of 12 mm, a lens diameter of 15 mm, and a back focal length of 18.3 mm; and said optical system has an effective focal length of 8.7 mm, a system aperture diameter of 15.7 mm, and a back focal length of 3.77 mm.

6. An infrared optical position detection and classification system in combination with a vehicle air bag deployment system, as defined in claim 5, wherein: said optical system has a field of view of 50 degrees.

* * * * *